(12) United States Patent
Haug

(10) Patent No.: US 6,309,769 B1
(45) Date of Patent: Oct. 30, 2001

(54) CARBON MONOXIDE FILTER LAYER

(75) Inventor: Andrew T. Haug, Columbia, SC (US)

(73) Assignee: Plug Power Inc., Latham, NY (US)

( * ) Notice: Subject to any disclaimer, the term of this patent is extended or adjusted under 35 U.S.C. 154(b) by 0 days.

(21) Appl. No.: 09/608,791

(22) Filed: Jun. 30, 2000

(51) Int. Cl.$^7$ ................................................ H01M 8/00
(52) U.S. Cl. ................ 429/13; 429/14; 429/17; 429/30; 429/32; 429/33; 429/34; 429/38; 429/39; 429/40; 429/41
(58) Field of Search .................. 204/282, 283; 429/40, 41, 30, 32, 33, 34, 38, 39, 13, 14, 17

(56) References Cited

U.S. PATENT DOCUMENTS

| | | | |
|---|---|---|---|
| 4,910,099 | 3/1990 | Gottesfeld | 429/13 |
| 5,028,498 | 7/1991 | Lindström | 429/40 |
| 5,183,713 | 2/1993 | Kunz | 429/44 |
| 5,208,207 | 5/1993 | Stonehart et al. | 502/339 |
| 5,211,984 | 5/1993 | Wilson | 427/115 |
| 5,271,916 | 12/1993 | Vanderborgh et al. | 423/246 |
| 5,330,727 | 7/1994 | Trocciola et al. | 422/177 |
| 5,786,026 | 7/1998 | Seko et al. | 427/115 |
| 5,922,487 | 7/1999 | Wantanabe et al. | 429/44 |
| 5,922,488 | 7/1999 | Marucchi-Soos et al. | 429/44 |
| 6,007,934 | 12/1999 | Auer et al. | 429/44 |

OTHER PUBLICATIONS

Bellows, et al. "Proposed Mechanism of CO Mitigation in PEMFCS by Using Dilute $H_2O_2$ in the Anode Humidifier," *Electrochemical Society Proceedings*, vol. 98–27:121–127. No month/year available.

Berlowitz, et al. "Kinetics of CO Oxidation on Single-Crystal Pd, Pt, and Ir," *J.Phys. Chem.* 95:5213–5221 (1988). No month available.

(List continued on next page.)

*Primary Examiner*—Bruce F. Bell
(74) *Attorney, Agent, or Firm*—Fish & Richardson P.C.

(57) ABSTRACT

A carbon monoxide filter layer that can be used, for example, in an electrode unit, a fuel cell, and/or a fuel cell stack is disclosed.

79 Claims, 10 Drawing Sheets

OTHER PUBLICATIONS

Dhar, et al. "Performance study of a Fuel Cell Pt–on–C Anode in Presence of Co and $CO_2$, and Calculation of Adsorption Parameters for CO Poisoning," *J. Electrochem. Soc.* vol. 133:1574–1582 (1986). No month available.

Gasteiger, et al. "$H_2$ and CO Electrooxidation on Well–Characterized Pt, Ru, and Pt–Ru. 1. Rotating Disk Electrode Studies of the Pure Gases Including Temperature Effects," *J.Phys. Chem.* 99:8290–8301 (1995). No month available.

Gasteiger, et al. "$H_2$ and CO Electrooxidation on Well–Characterized Pt, Ru, and Pt–Ru. 2. Rotating Disk Electrode Studies of $CO/H_2$ Mixtures at 62° C," *J.Phys. Chem.* 99:16757–16767 (1995). No month available.

Götz, et al. "Preparation and Evaluation of Cocatalyst Systems for Anodic Oxidation of Methanol in PEM Fuel Cells," *Institut fur Chemische Technologie*. No month/year available.

Grgur, et al. "On the Mechanism of Co–Tolerance of PT–MO Alloy Electrocatalysts" *Electrochemical Society Proceedings*, vol. 98–27:176–186. No month/year available.

Grgur, et al. "The Electro–oxidation of $H_2$ and $H_2/CO$ Mixtures on Carbon–Supported $Pt_xMo_y$, Alloy Catalysts" *Journal of The Electrochemical Society*, 146:1613–1619 (1999). No month available.

Imbihl, et al. "Kinetic Oscillations in the Catalytic CO Oxidation on Pt (100: Theory" *J. Chem Phys.* 83:1578–1587 (1985). No month available.

Iwase, et al. "Optimized CO Tolerant Electrocatalysts for Polymer Electrolyte Fuel Cells," *Electrochemical Society Proceedings*, vol. 95–23:12–23. No month/year available.

Koper, et al. "Lattice Gas Model for CO Electrooxidation on Pt–Ru Bimetallic Surfaces," *J. Phys. Chem.* 103:5522–5529 (1999). No month available.

Oetjen, et al. "Performance Data of a Proton Exchange Membrane Fuel Cell Using $H_2/CO$ as Fuel Gas," *J. Electrochem. Soc.* 143:3838–3842 (1996). No month available.

Schmidt, et al. "Performance Improvement of a PEMFC Using Fuels with CO by Addition of Oxygen–Evolving Compounds."No month/year available.

Wang, et al. "On the Reaction Pathway for Methanol and Carbon Monoxide Electrooxidation on Pt–Sn Alloy Versus Pt–Ru Alloy Surfaces," *Electrochimica Acta.* 41:2587–2593 (1996). No month available.

Watanabe, et al. "Design of CO Tolerant Anode Catalysts for Polymer Electrolyte Fuel Cell," *Electrochemistry*, 67:1194–1196 (1999). No month available.

CARBON MONOXIDE FILTER LAYER

The invention relates to a carbon monoxide filter layer that can be used, for example, in an electrode unit, a fuel cell, and/or a fuel cell stack.

BACKGROUND

A fuel cell can convert chemical energy to electrical energy by promoting a chemical reaction between two gases.

One type of fuel cell includes a cathode flow field plate, an anode flow field plate, a membrane electrode assembly disposed between the cathode flow field plate and the anode flow field plate, and two gas diffusion layers disposed between the cathode flow field plate and the anode flow field plate. A fuel cell can also include one or more coolant flow field plates disposed adjacent the exterior of the anode flow field plate and/or the exterior of the cathode flow field plate.

Each flow field plate has an inlet region, an outlet region and open-faced channels connecting the inlet region to the outlet region and providing a way for distributing the gases to the membrane electrode assembly.

The membrane electrode assembly usually includes a solid electrolyte (e.g., a proton exchange membrane, commonly abbreviated as a PEM) between a first catalyst and a second catalyst. One gas diffusion layer is between the first catalyst and the anode flow field plate, and the other gas diffusion layer is between the second catalyst and the cathode flow field plate.

During operation of the fuel cell, one of the gases (the anode gas) enters the anode flow field plate at the inlet region of the anode flow field plate and flows through the channels of the anode flow field plate toward the outlet region of the anode flow field plate. The other gas (the cathode gas) enters the cathode flow field plate at the inlet region of the cathode flow field plate and flows through the channels of the cathode flow field plate toward the cathode flow field plate outlet region.

As the anode gas flows through the channels of the anode flow field plate, the anode gas passes through the anode gas diffusion layer and interacts with the anode catalyst. Similarly, as the cathode gas flows through the channels of the cathode flow field plate, the cathode gas passes through the cathode gas diffusion layer and interacts with the cathode catalyst.

The anode catalyst interacts with the anode gas to catalyze the conversion of the anode gas to reaction intermediates. The reaction intermediates include ions and electrons. The cathode catalyst interacts with the cathode gas and the reaction intermediates to catalyze the conversion of the cathode gas to the chemical product of the fuel cell reaction.

The chemical product of the fuel cell reaction flows through a gas diffusion layer to the channels of a flow field plate (e.g., the cathode flow field plate). The chemical product then flows along the channels of the flow field plate toward the outlet region of the flow field plate.

The electrolyte provides a barrier to the flow of the electrons and gases from one side of the membrane electrode assembly to the other side of the membrane electrode assembly. However, the electrolyte allows ionic reaction intermediates to flow from the anode side of the membrane electrode assembly to the cathode side of the membrane electrode assembly.

Therefore, the ionic reaction intermediates can flow from the anode side of the membrane electrode assembly to the cathode side of the membrane electrode assembly without exiting the fuel cell. In contrast, the electrons flow from the anode side of the membrane electrode assembly to the cathode side of the membrane electrode assembly by electrically connecting an external load between the anode flow field plate and the cathode flow field plate. The external load allows the electrons to flow from the anode side of the membrane electrode assembly, through the anode flow field plate, through the load and to the cathode flow field plate.

Because electrons are formed at the anode side of the membrane electrode assembly, that means the anode gas undergoes oxidation during the fuel cell reaction. Because electrons are consumed at the cathode side of the membrane electrode assembly, that means the cathode gas undergoes reduction during the fuel cell reaction.

For example, when hydrogen and oxygen are the gases used in a fuel cell, the hydrogen flows through the anode flow field plate and undergoes oxidation. The oxygen flows through the cathode flow field plate and undergoes reduction. The specific reactions that occur in the fuel cell are represented in equations 1–3.

$$H_2 \rightarrow 2H^+ + 2e^- \tag{1}$$

$$\tfrac{1}{2}O_2 + 2H^+ + 2e^- \rightarrow H_2O \tag{2}$$

$$H_2 + \tfrac{1}{2}O_2 \rightarrow H_2O \tag{3}$$

As shown in equation 1, the hydrogen forms protons ($H^+$) and electrons. The protons flow through the electrolyte to the cathode side of the membrane electrode assembly, and the electrons flow from the anode side of the membrane electrode assembly to the cathode side of the membrane electrode assembly through the external load. As shown in equation 2, the electrons and protons react with the oxygen to form water. Equation 3 shows the overall fuel cell reaction.

In addition to forming chemical products, the fuel cell reaction produces heat. One or more coolant flow field plates are typically used to conduct the heat away from the fuel cell and prevent it from overheating.

Each coolant flow field plate has an inlet region, an outlet region and channels that provide fluid communication between the coolant flow field plate inlet region and the coolant flow field plate outlet region. A coolant (e.g., liquid de-ionized water) at a relatively low temperature enters the coolant flow field plate at the inlet region, flows through the channels of the coolant flow field plate toward the outlet region of the coolant flow field plate, and exits the coolant flow field plate at the outlet region of the coolant flow field plate. As the coolant flows through the channels of the coolant flow field plate, the coolant absorbs heat formed in the fuel cell. When the coolant exits the coolant flow field plate, the heat absorbed by the coolant is removed from the fuel cell.

To increase the electrical energy available, a plurality of fuel cells can be arranged in series to form a fuel cell stack. In a fuel cell stack, one side of a flow field plate functions as the anode flow field plate for one fuel cell while the opposite side of the flow field plate functions as the cathode flow field plate in another fuel cell. This arrangement may be referred to as a bipolar plate. The stack may also include monopolar plates such as, for example, an anode coolant flow field plate having one side that serves as an anode flow field plate and another side that serves as a coolant flow field plate. As an example, the open-faced coolant channels of an anode coolant flow field plate and a cathode coolant flow field plate may be mated to form collective coolant channels to cool the adjacent flow field plates forming fuel cells.

SUMMARY

The invention relates to a carbon monoxide filter layer that can be used, for example, in an electrode unit, a fuel cell, and/or a fuel cell stack.

Under some circumstances, carbon monoxide is present in the anode gas and/or the cathode gas. Without a carbon monoxide filter layer, the carbon monoxide can adsorb to a catalyst layer, thereby blocking sites for hydrogen adsorption on the catalyst layer. This can reduce the performance of an electrode unit, fuel cell or fuel cell stack. The carbon monoxide filter layer can be disposed along the flow path of the gas such that the gas contacts the carbon monoxide filter layer before contacting the catalyst layer. At least some of the carbon monoxide present in the gas can adsorb to the carbon monoxide filter layer, which reduces the amount of carbon monoxide that can adsorb to the catalyst layer, thereby improving performance of the electrode unit, fuel cell or fuel cell stack. The carbon monoxide filter layer can have a relatively compact and economical design.

In one aspect, the invention features an electrode unit having a carbon monoxide filter layer, two gas diffusion layers, two catalyst layers, and a solid electrolyte. The catalyst layers are disposed between the gas diffusion layers, and the solid electrolyte is disposed between the two catalyst layers. The carbon monoxide filter layer is disposed between one of the gas diffusion layers and one of the catalyst layers. Alternatively, the carbon monoxide filter layer is disposed such that one of the gas diffusion layers is disposed between the carbon monoxide filter layer and a catalyst layer.

Embodiments can include one or more of the following features.

The electrode unit can further include another carbon monoxide filter layer that is disposed between a gas diffusion layer and a catalyst layer.

The catalyst layer can be formed of platinum, and the solid electrolyte can be formed of a sulphonated fluorocarbon polymer. The carbon monoxide filter layer(s) can be formed of molybdenum, nickel, rhodium, ruthenium, tin, tungsten, or alloys thereof.

In some embodiments, the carbon monoxide filter layer prevents at least 50% (e.g., at least about 75%, such as at least about 90%) of the carbon monoxide contacting the carbon monoxide filter layer from also contacting the catalyst layer that is adjacent to the carbon monoxide filter layer.

In certain embodiments, under otherwise identical reaction conditions, the rate of reaction of hydrogen is at least about 10 times (e.g., at least about 50 times, such as at least about 100 times) faster with the catalyst layer adjacent the carbon monoxide filter layer than with the carbon monoxide filter layer.

In another aspect, the invention features a fuel cell having two flow field plates and an electrode unit disposed therebetween.

In a further aspect, the invention features a fuel cell stack two or more fuel cells configured such that the inlets of the fuel cells are in fluid communication, and the outlets of the fuel cells are in fluid communication.

In yet another aspect, the invention features a method of operating a fuel cell system. The method includes introducing a gas to a fuel cell, contacting the gas with a carbon monoxide filter layer contained in the fuel cell, and contacting the gas with a first catalyst layer contained in the fuel cell.

The gas can include hydrogen and carbon monoxide and optionally oxygen.

The gas can contact the carbon monoxide filter layer before contacting the catalyst layer.

Contacting the gas with the carbon monoxide filter layer can cause carbon monoxide to adsorb on the carbon monoxide filter layer.

The method can further include introducing the gas into a second fuel cell and contacting the gas with a catalyst layer contained in the second fuel cell.

The method can also include introducing a different gas to the fuel cell and contacting the different gas with a different catalyst layer. One gas can be an anode gas, and the other gas can be a cathode gas. The method can cause the formation of protons and electrons, which can be reacted with oxygen to form water and an electrical power output.

Other advantages and features will be understood from the figures, detailed description and claims.

DETAILED DESCRIPTION

Figure 1:
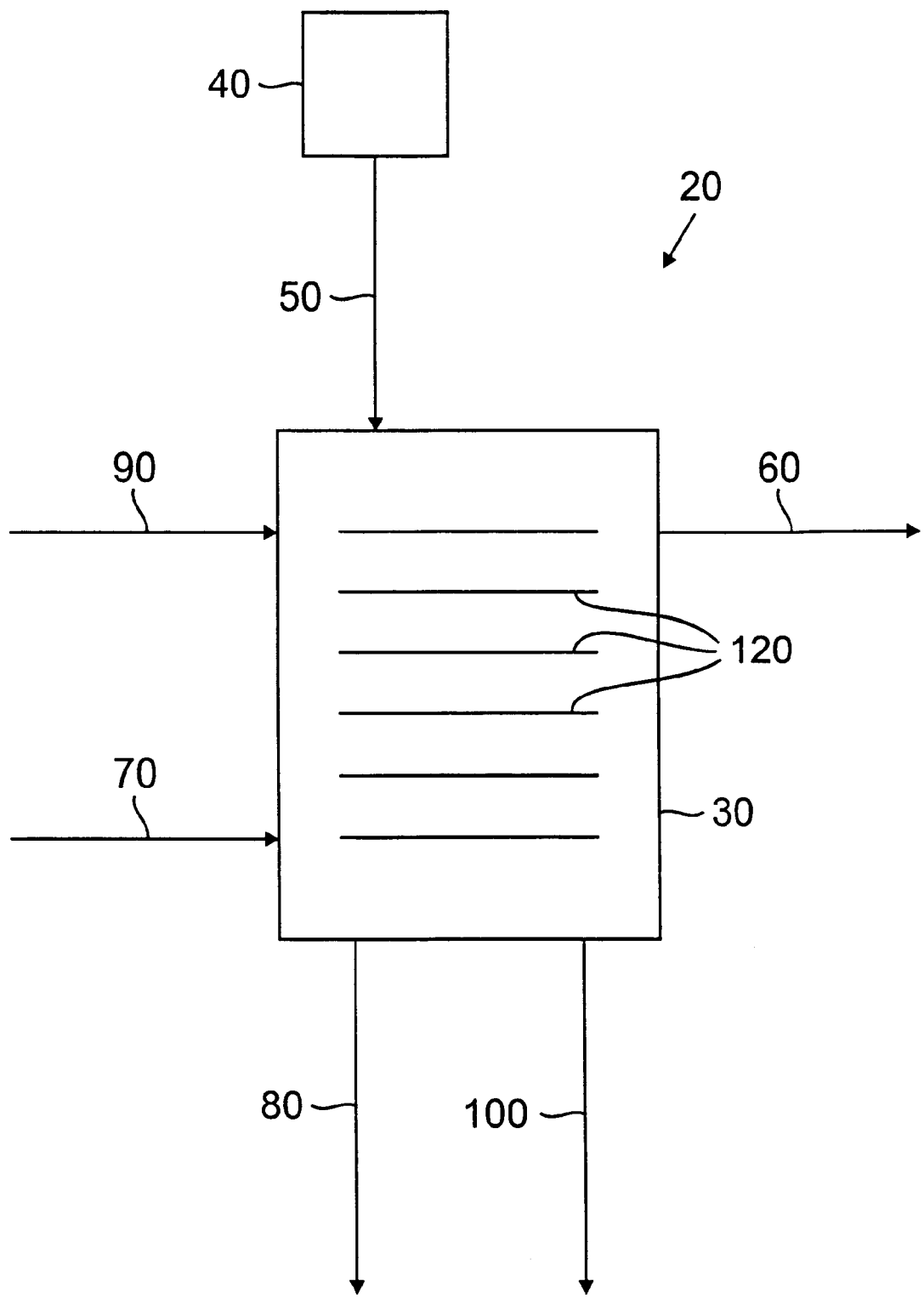
FIG. 1 is a schematic diagram of an embodiment of a fuel cell system.

FIG. 1 shows a fuel cell system 20 having a fuel cell stack 30 which includes a plurality of fuel cells 120. Fuel cell stack 30 also includes an anode gas supply 40, an anode gas inlet line 50, an anode gas outlet line 60, a cathode gas inlet line 70, a cathode gas outlet line 80, a coolant inlet line 90, and a coolant outlet line 100.

Figure 2:
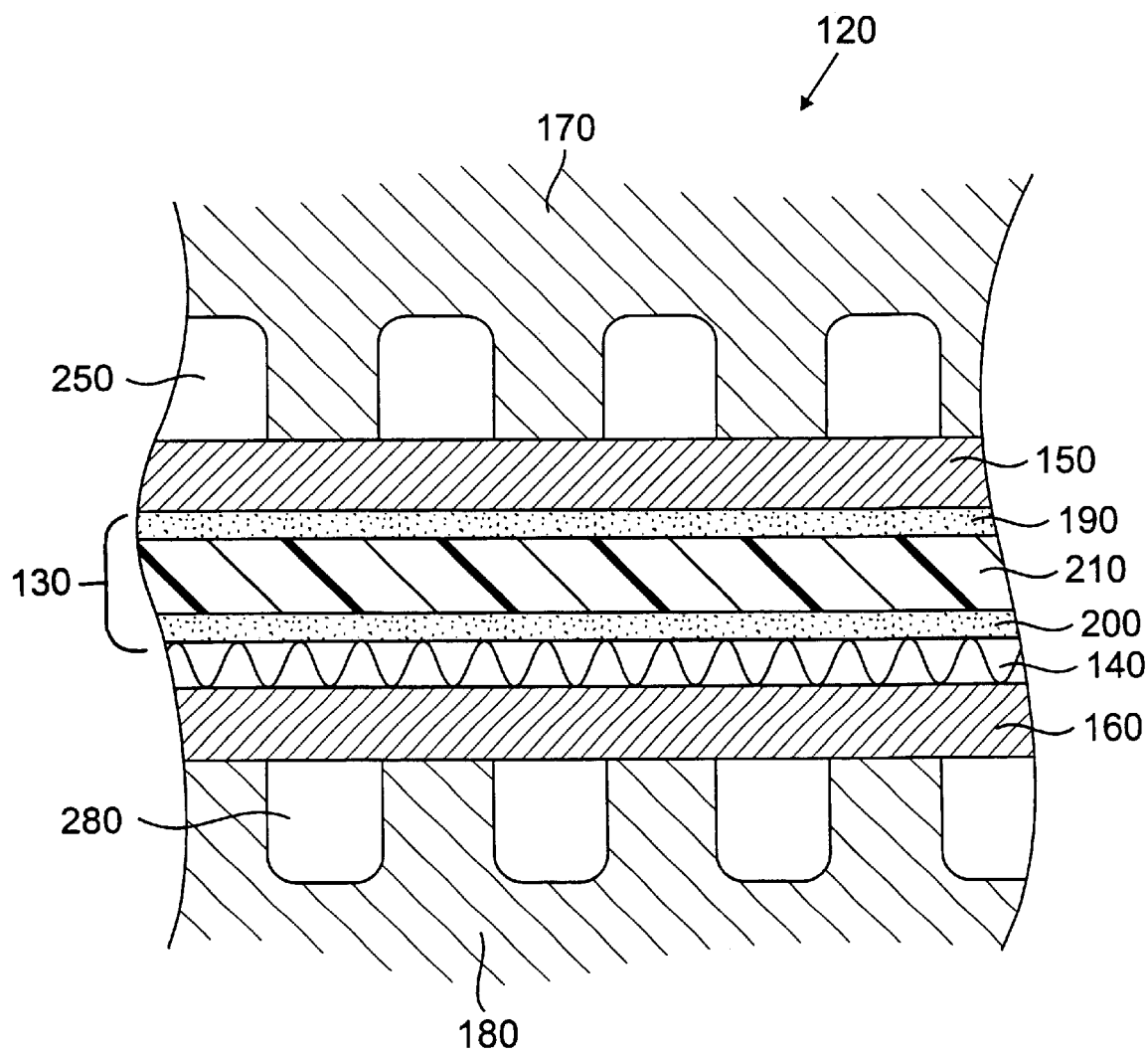
FIG. 2 is a partial cross-sectional view of an embodiment of a fuel cell.
Figure 3:
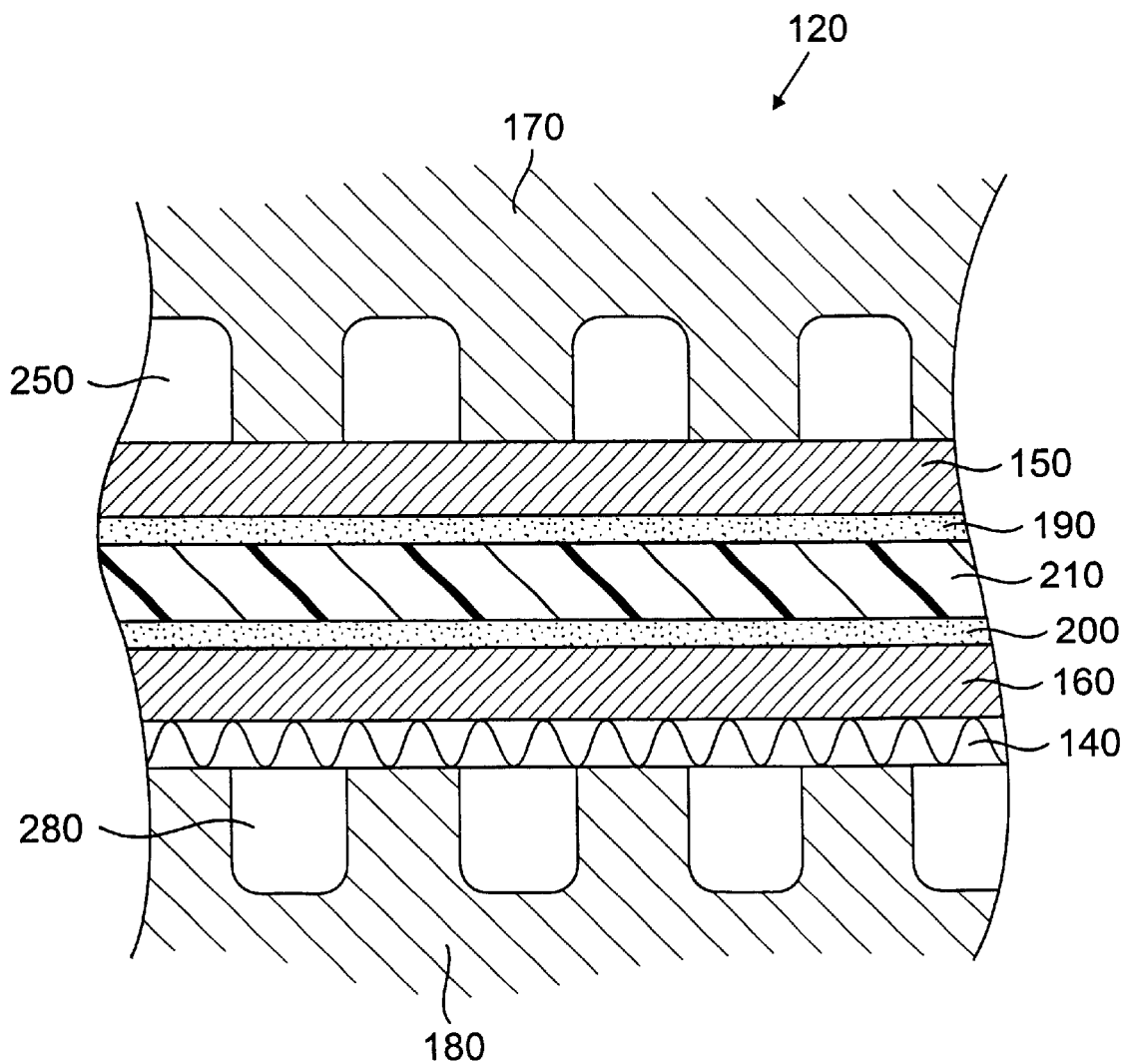
FIG. 3 is a partial cross-sectional view of an embodiment of a fuel cell.

FIG. 2 shows an embodiment of fuel cell 120 having a membrane electrode assembly (MEA) 130, a carbon monoxide filter layer 140, gas diffusion layers (GDLs) 150 and 160, a cathode flow field plate 170, and an anode flow field plate 180. MEA 130 includes catalyst layers 190 and 200 and a solid electrolyte 210 between layers 190 and 200. Cathode flow field plate 170 has cathode gas channels 250, and anode flow field plate 180 has channels 280. FIG. 3 shows another embodiment of fuel cell 120 in which carbon monoxide layer 140 is disposed between GDL 160 and anode flow field plate 180.

Carbon monoxide filter layer 140 is formed of a material to which carbon monoxide can adsorb, while still allowing hydrogen to pass through to catalyst layer 200. Therefore, by placing layer 140 such that the anode gas contacts layer 140 before contacting layer 200, at least some of the carbon monoxide present in the anode gas adsorbs to layer 140, reducing the amount of carbon monoxide that adsorbs to layer 200. At the same time, however, at least some of the hydrogen present in the anode gas does not adsorb to layer 140, but passes to layer 200 where it can adsorbs to the surface of layer 200. This decreases the amount of carbon monoxide that blocks hydrogen adsorption sites on layer 200, but does not substantially decrease the amount of hydrogen that adsorbs to layer 200. Therefore, under the same operating conditions, fuel cell 120 can provide improved performance relative to an otherwise substantially identical fuel cell that does not include carbon monoxide filter layer 140.

In some embodiments, carbon monoxide can adsorb to layer 140 at least as readily as carbon monoxide can adsorb to layer 200 (e.g., under the same conditions the absolute value of the energy of adsorption for carbon monoxide on layer 140 is about equal to or greater than the absolute value of the energy of adsorption for carbon monoxide on layer 200). In these embodiments, layer 140 can be particularly effective in reducing the amount of carbon monoxide contained in the anode gas that reaches layer 200. In certain embodiments, layer 140 prevents at least about 50% of the carbon monoxide that contacts layer 140 from contacting layer 200 (e.g., at least about 75%, such as at least about 95%).

In certain embodiments, under the same conditions hydrogen reacts with layer 140 more slowly than hydrogen reacts with layer 200. For example, under other identical reaction conditions, hydrogen can react with layer 200 at least about 10 times more quickly than hydrogen reacts with layer 140 (e.g., at least about 50 times more quickly, such as at least about 100 times more quickly). In these embodiments, layer 140 does not substantially decrease the amount of hydrogen in the anode gas that adsorbs to layer 200.

Filter layer 140 can be formed of any material capable of adsorbing carbon monoxide, while allowing hydrogen to pass therethrough. Such materials include, for example, certain metals and alloys, such as molybdenum, nickel, rhodium, ruthenium, tin, tungsten, and/or their alloys. The material can be dispersed on, for example, carbon black. In certain embodiments, layer 140 is formed of ruthenium (e.g., ruthenium dispersed on carbon black). In some embodiments, layer 140 can be formed by applying a suspension containing the material of layer 140 to gas diffusion layer 160, and then drying the suspension. The method can involve the use of heat and/or pressure to achieve bonding.

In some embodiments, the performance of fuel cell 120 can be enhanced by adding oxygen to the anode gas. The added oxygen can react with carbon monoxide adsorbed to layer 140 to form gaseous carbon dioxide, which is removed from fuel cell 120 in the anode gas stream. This frees up the carbon monoxide adsorption sites on layer 140 in a dynamic manner, and additional carbon monoxide can adsorb to layer 140 as additional anode gas is exposed to layer 140. This allows carbon monoxide to continue to adsorb to layer 140 under conditions where carbon monoxide would not otherwise be able to adsorb to layer 140. This can reduce the tendency of fuel cell 120 to exhibit a decreased ability to adsorb carbon monoxide as additional anode gas is introduced into fuel cell 120.

In the absence of layer 140, adding oxygen to the anode gas may be less effective in assisting in the performance of fuel cell 120 because the oxygen may preferentially oxidize hydrogen adsorbed to layer 200 rather than oxidizing carbon monoxide adsorbed to layer 200. In contrast, however, in fuel cell 120, the oxygen added to the anode gas can react with carbon monoxide adsorbed to layer 140 without oxidizing a substantial amount of hydrogen adsorbed to layer 200. This feature can be enhanced when oxygen adsorbs to layer 140 at least as readily as oxygen adsorbs to layer 200 (e.g., when under the same conditions the absolute value of the energy of adsorption for oxygen on layer 140 is about equal to or greater than the absolute value of the energy of adsorption for oxygen on layer 200).

Figure 4:
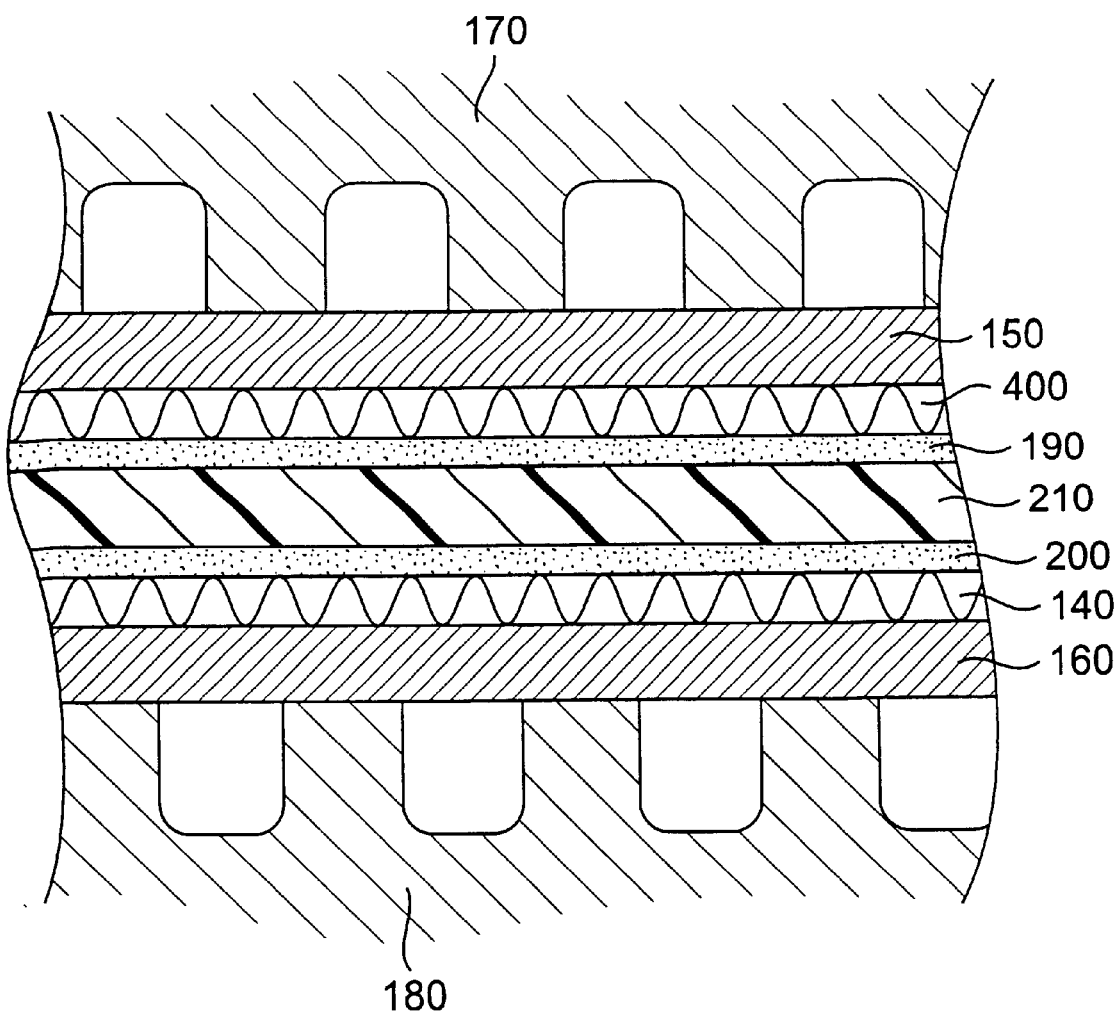
FIG. 4 is a partial cross-sectional view of an embodiment of a fuel cell.

FIG. 4 shows another embodiment of fuel cell 120 in which a second carbon monoxide filter layer 400 is disposed on the cathode side of fuel cell 120, between catalyst layer 190 and GDL 150. Filter layer 400 is generally as described above with respect to filter layer 140 and can be used for filtering carbon monoxide in the cathode gas before the cathode gas contacts catalyst layer 190.

Figure 5:
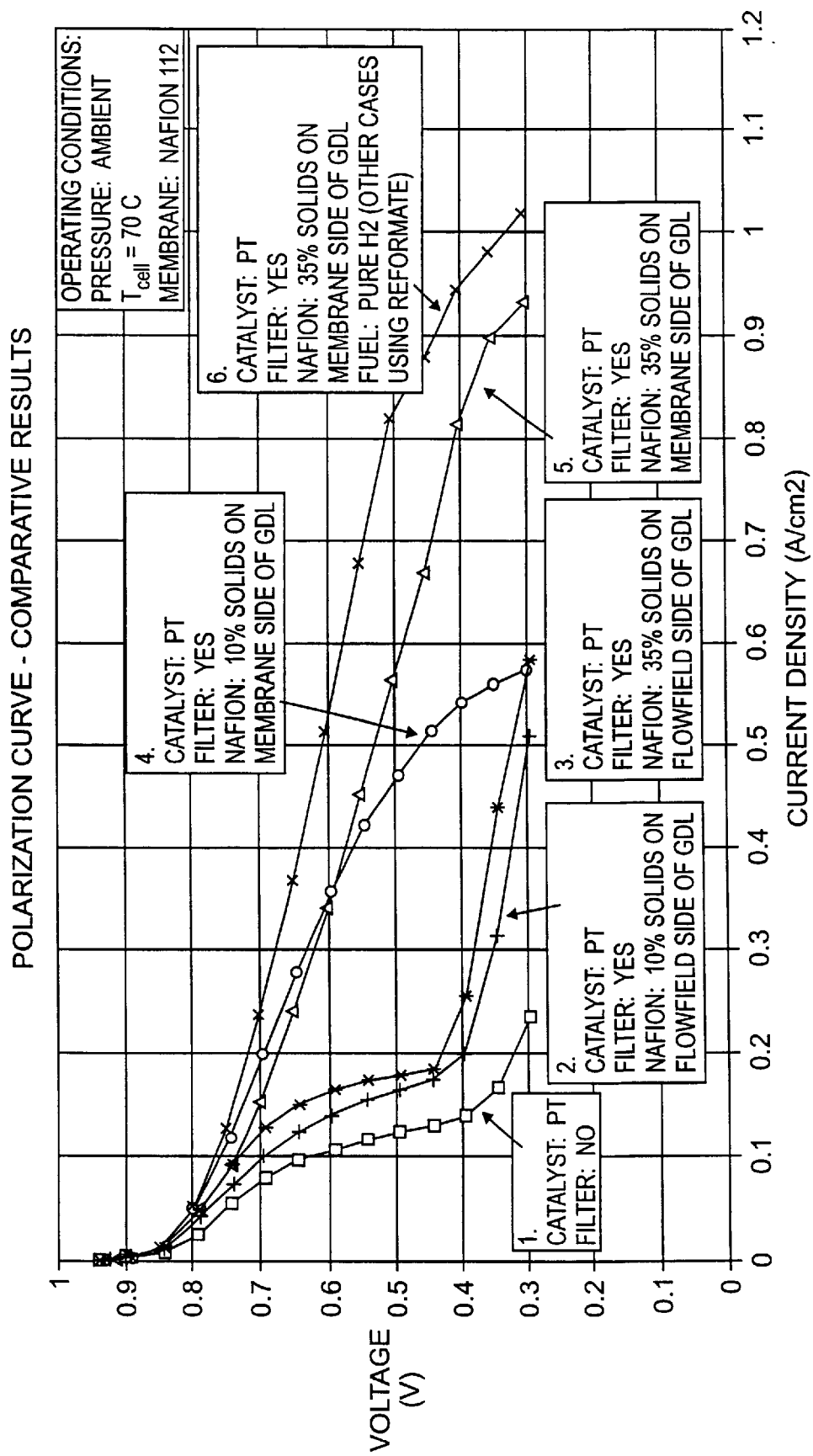
FIG. 5 is a plot of voltage vs. current density for a fuel cell assembly having a carbon monoxide filter with different concentrations of solid polymer and different placement within the fuel cell assembly.

FIG. 5 shows the performance of a fuel cell assembly having a CO filter operating with a reformate anode gas having a 2% $O_2$ feed. Curve 1 is a base line showing the performance of a fuel cell with a pure platinum catalyst (not alloyed with ruthenium, for example), and having no CO filter under the present invention. In curves 2–6, a CO filter under the present invention is utilized. For a discussion of the preparation of the catalyst and CO filter layers represented in FIG. 5, see the Example presented at the end of this section. In curves 2 and 4, the CO filter layer contains 10% NAFION™ solids, and in curves 3 and 5, the CO filter contains 35% NAFION™ solids. In all cases, the platinum catalyst layers contain 25% NAFION™ solids. In curves 2 and 3, the CO filter layer is placed in the fuel cell assembly on the flowfield side of the GDL. In curves 4 and 5, the CO filter layer is placed in the fuel cell on the membrane side of the GDL. In curves 1–5, the fuel cells are utilizing a reformate having (on a dry basis) about 40% $H_2$, 25% $CO_2$, 2% $O_2$, 50 ppm CO, and a balance of $N_2$. In curve 6, pure $H_2$ is used as a reference.

Referring to FIGS. 2–4, electrolyte 210 should be capable of allowing ions to flow therethrough while providing a substantial resistance to the flow of electrons. In some embodiments, electrolyte 210 is a solid polymer (e.g., a solid polymer ion exchange membrane), such as a solid polymer proton exchange membrane (e.g., a solid polymer containing sulfonic acid groups). Such membranes are commercially available from E.I. DuPont de Nemours Company (Wilmington, Del.) under the trademark NAFION. Alternatively, electrolyte 210 can also be prepared from the commercial product GORE-SELECT, available from W. L. Gore & Associates (Elkton, Md.).

Catalyst layer 200 can be formed of a material capable of interacting with hydrogen to form protons and electrons. Examples of such materials include, for example, platinum, platinum alloys, and platinum dispersed on carbon black. Alternatively, a suspension is applied to the surfaces of gas diffusion layers (described below) that face solid electrolyte 210, and the suspension is then dried. During the preparation of MEA 130, catalyst material (e.g., platinum) can be applied to electrolyte 210 using standard techniques. The method of preparing layer 200 may further include the use of pressure and temperature to achieve bonding.

Catalyst layer 190 can be formed of a material capable of interacting with oxygen, electrons and protons to form water. Examples of such materials include, for example, platinum, platinum alloys, and noble metals dispersed on carbon black. Catalyst layer 190 can be prepared as described above with respect to catalyst layer 200.

Gas diffusion layers 150 and 160 are electrically conductive so that electrons can flow from catalyst layer 200 to flow field plate 180 and from flow field plate 170 to catalyst layer 190. GDLs can be formed of a material that is both gas and liquid permeable. It may also be desirable to provide the GDLs with a planarizing layer, as is known in the art, for example, by infusing a porous carbon cloth or paper with a slurry of carbon black followed by sintering with a polytetrafluoroethylene material. Suitable GDLs are available from various companies such as Etek in Natick, Mass., and Zoltek in St. Louis, Mo.

Figure 6:
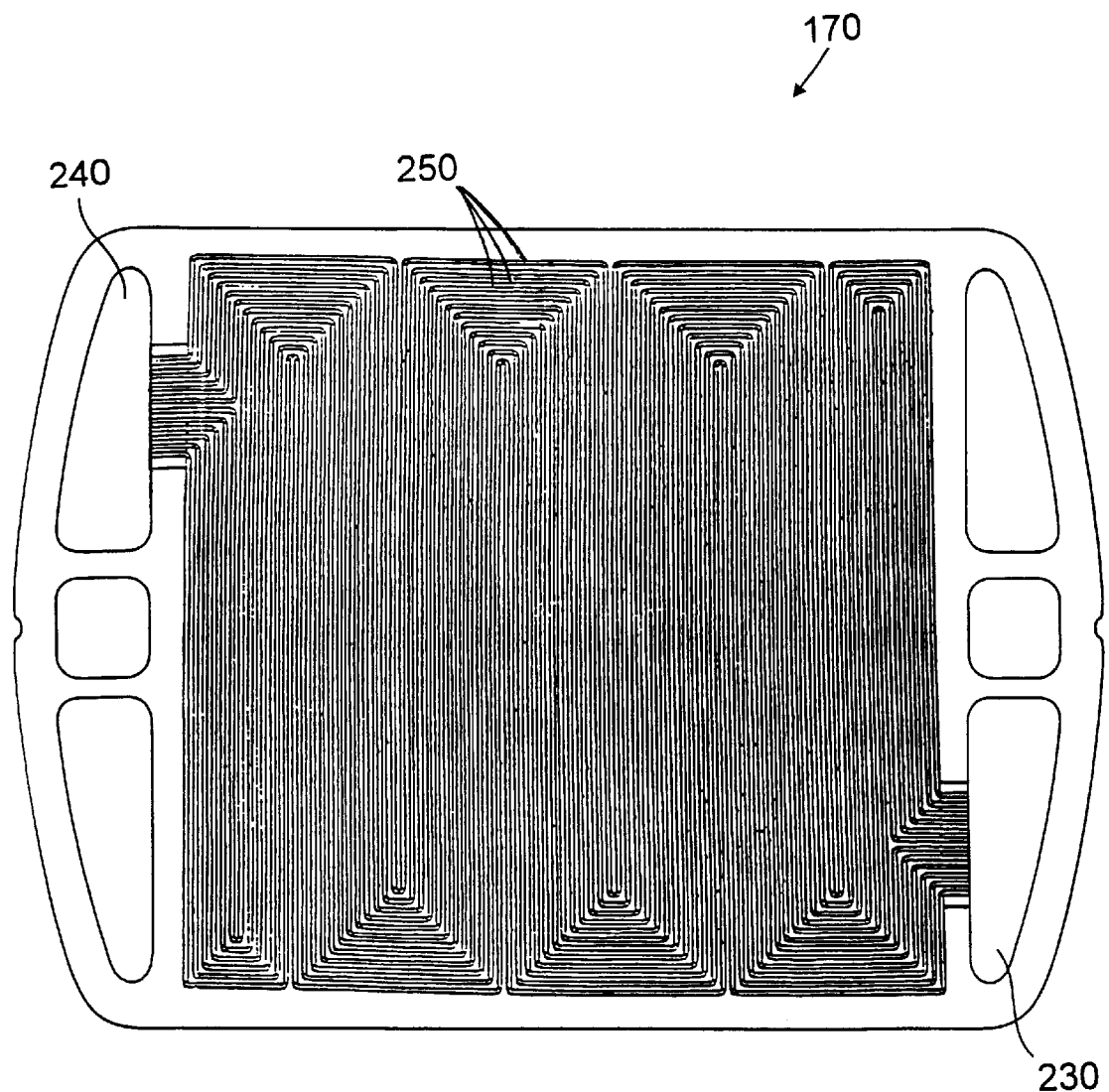
FIG. 6 is an elevational view of an embodiment of a cathode flow field plate.

FIG. 6 shows a cathode flow field plate 170 having an inlet 230, an outlet 240, and open-faced channels 250 that define a flow path for a cathode gas from inlet 230 to outlet 240. A cathode gas flows from cathode gas inlet line 70 and enters flow field plate 170 via inlet 230 to cathode outlet line 80. The cathode gas then flows along channels 250 and exits flow field plate 170 via outlet 240. As the cathode gas flows along channels 250, oxygen contained in the cathode gas can permeate gas diffusion layer 150 (and carbon monoxide filter layer 400 if present) and interact with catalyst layer 190. Electrons and protons present at layer 150 react with the oxygen to form water. The water can pass back through diffusion layer 150, enter the cathode gas stream in channels 250, and exit plate 170 through cathode flow field plate outlet 240.

Figure 7:
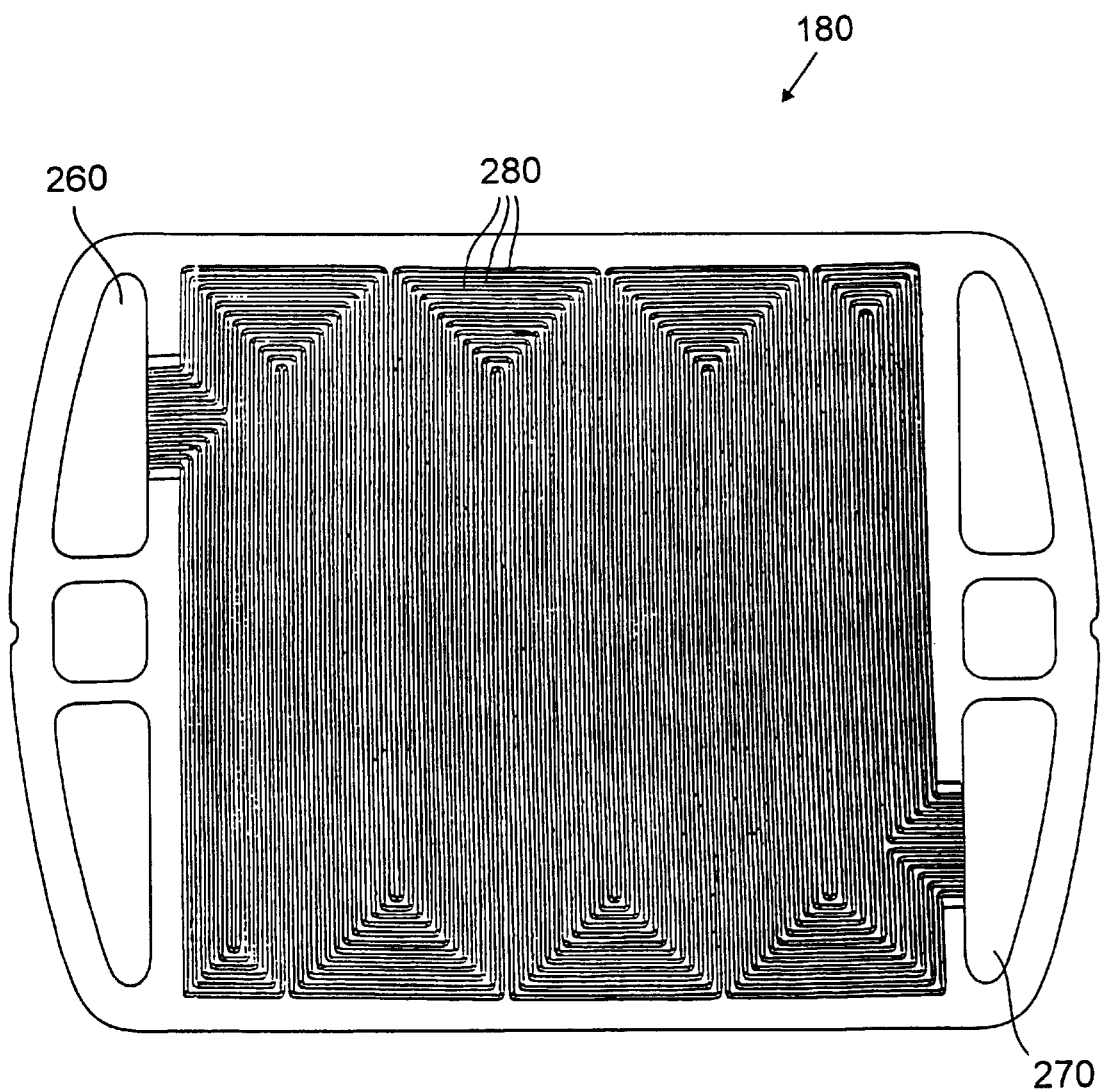
FIG. 7 is an elevational view of an embodiment of an anode flow field plate

FIG. 7 shows an anode flow field plate 180 having an inlet 260, an outlet 270, and open-faced channels 280 that define a flow path for an anode gas from inlet 260 to outlet 270. An anode gas flows from the anode gas inlet line 50 and enters flow field plate 180 via inlet 260. The anode gas then flows along channels 280 and exits flow field plate 180 via outlet 270 to anode outlet line 60. As the anode gas flows along channels 280, hydrogen contained in the anode gas can permeate gas diffusion layer 160 (and carbon monoxide filter layer 140) and interact with catalyst layer 200 to form protons and electrons. The protons pass through solid electrolyte 210, and the electrons are conducted through gas diffusion layer 160 to anode flow field plate 180, ultimately flowing through an external load to cathode flow field plate 170.

Figure 8:
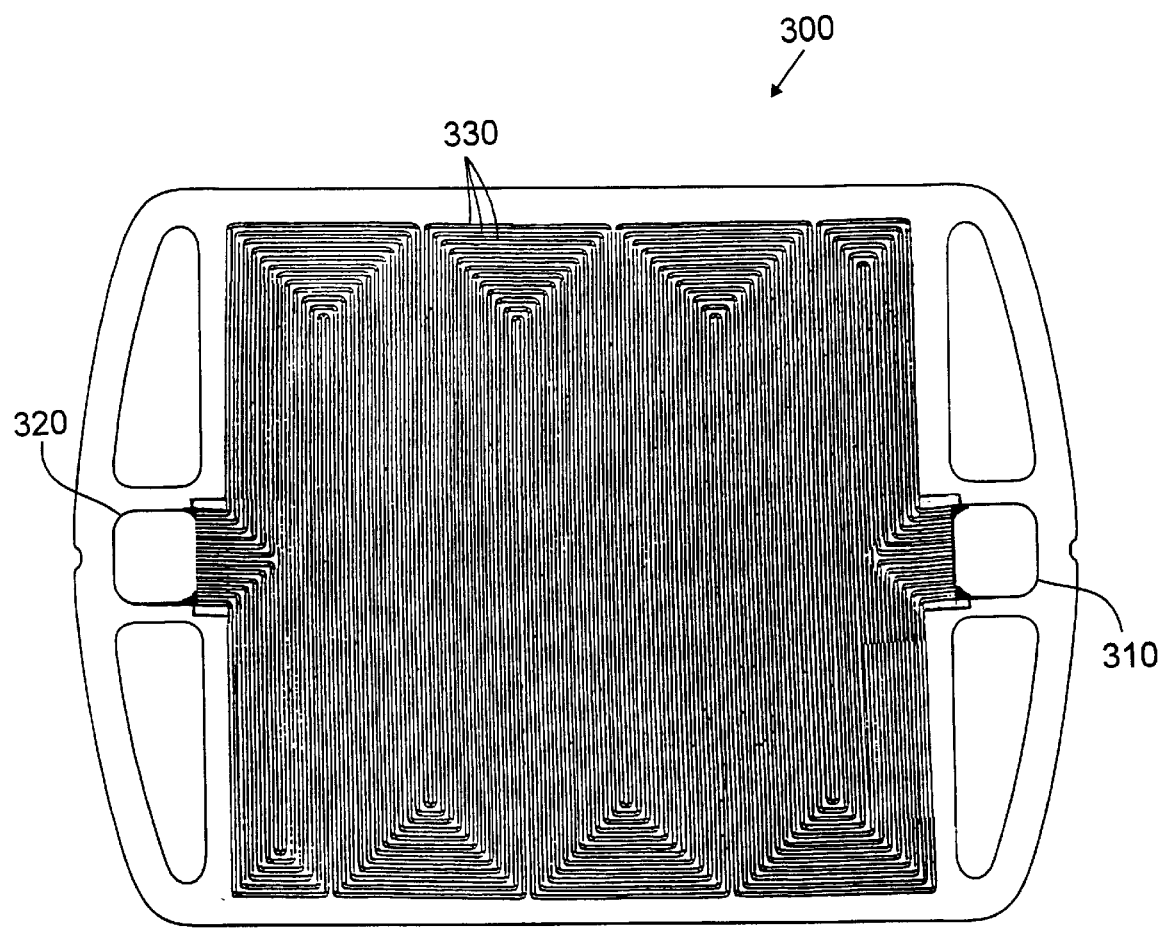
FIG. 8 is an elevational view of an embodiment of a coolant flow field plate.

Heat produced during the fuel cell reaction is removed from fuel cell 120 by flowing a coolant through fuel cell 120 via a coolant flow field plate. FIG. 8 shows a coolant flow field plate 300 having an inlet 310, an outlet 320 and open-faced channels 330 that define a flow path for coolant from inlet 310 to outlet 320. The coolant enters fuel cell 120 from coolant inlet line 90 via inlet 310, flows along channels 330 and absorbs heat, and exits fuel cell 120 via outlet 320 to coolant outlet line 100.

Fuel cells 120 are arranged within fuel cell stack 30 such that inlets 260 are configured to be in fluid communication with anode gas inlet line 50, and outlets 270 are configured to be in fluid communication with anode gas outlet line 60. Similarly, inlets 230 are configured to be in fluid communication with cathode gas inlet line 70, and outlets 240 are configured to be in fluid communication with cathode gas outlet line 80. Likewise, inlets 310 are configured to be in fluid communication with coolant inlet line 90, and outlets 320 are configured to be in fluid communication with cathode gas outlet line 100.

While certain embodiments have been described, other embodiments are contemplated. For example, in some embodiments, a fuel cell can include a carbon monoxide layer on the cathode side without a carbon monoxide layer on the anode side. In certain embodiments, a fuel cell can include multiple carbon monoxide layer on the anode side, the cathode side or both.

Methods of making membrane electrode assemblies and membrane electrode units are known, and are described, for example, in U.S. Pat. No. 5,211,984, which is hereby incorporated by reference.

Figure 9:
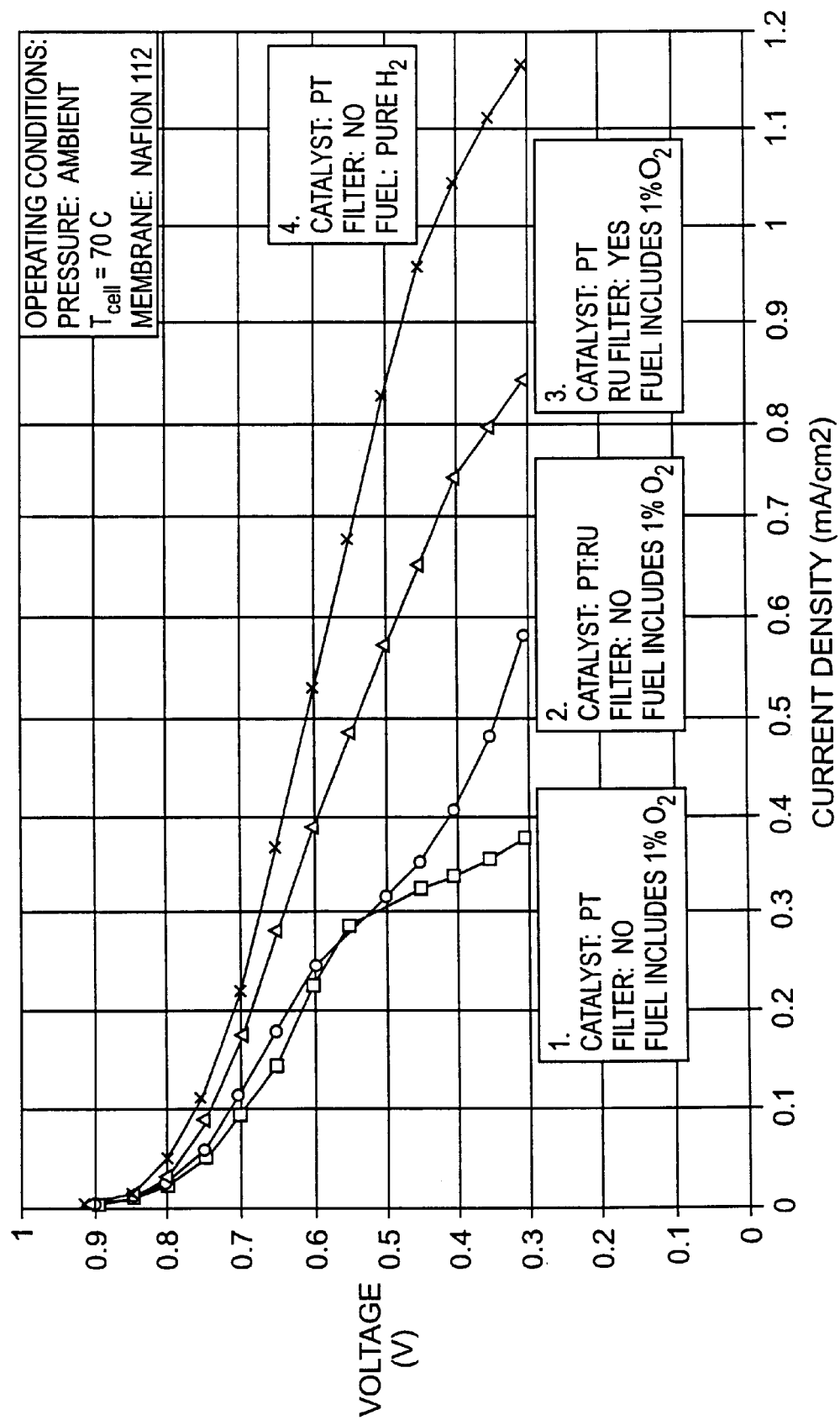
FIG. 9 is a plot of voltage vs. current density for a fuel cell assembly having a carbon monoxide filter operating with a reformate anode gas having a 1% $O_2$ feed.
Figure 10:
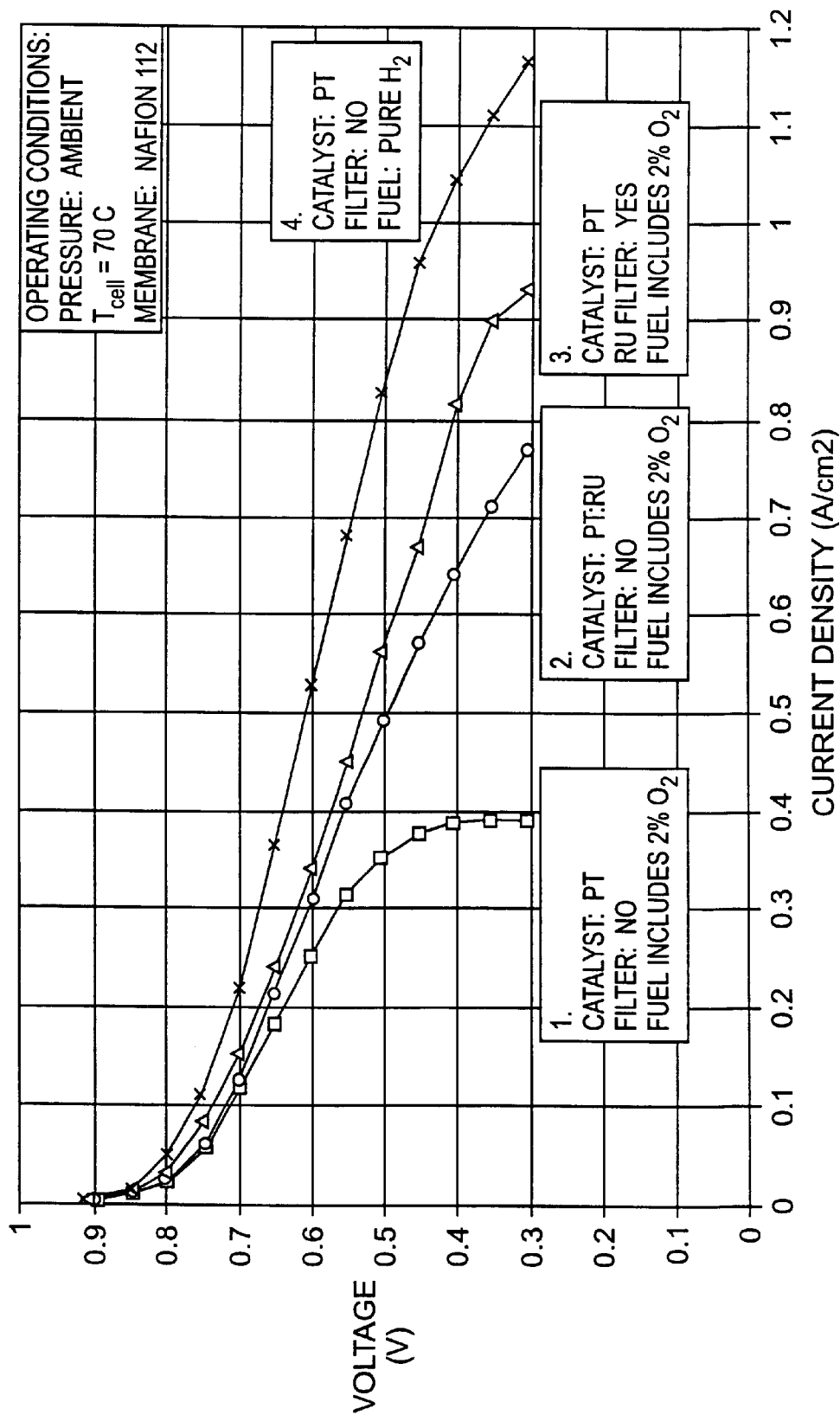
FIG. 10 is a plot of voltage vs. current density for a fuel cell assembly having a carbon monoxide filter operating with a reformate anode gas having a 2% $O_2$ feed.

FIGS. 9 and 10 demonstrate the improved performance of a fuel cell assembly having a CO filter under the present invention relative to the other fuel cell configurations shown. A comparison of FIGS. 9 and 10 also demonstrates a general improvement in performance achieved by increasing the amount of $O_2$ in the fuel stream from 1% (FIG. 9) to 2% (FIG. 10.).

In FIG. 9, curve 1 is a base line showing the performance of a fuel cell with a pure platinum catalyst (not alloyed with ruthenium, for example), and having no filter under the present invention. In curves 1–3, the fuel cells are utilizing a reformate having (on a dry basis) about 40% $H_2$, 25% $CO_2$, 1% $O_2$, 50 ppm CO, and a balance of $N_2$. In curve 4, pure $H_2$ is used as a reference. Curve 2 shows the performance of a fuel cell with no CO filter, utilizing a catalyst made from a platinum ruthenium alloy. Curve 3 shows the performance of a fuel cell utilizing a CO filter under the present invention.

Similarly, in FIG. 10, curve 1 is a base line showing the performance of a fuel cell with a pure platinum catalyst (not alloyed with ruthenium, for example), and having no filter under the present invention. In curves 1–3, the fuel cells are utilizing a reformate having (on a dry basis) about 40% $H_2$, 25% $CO_2$, 2% $O_2$, 50 ppm CO, and a balance of $N_2$. In curve 4, pure $H_2$ is used as a reference. Curve 2 shows the performance of a fuel cell with no CO filter, utilizing a catalyst made from a platinum ruthenium alloy. Curve 3 shows the performance of a fuel cell utilizing a CO filter under the present invention.

EXAMPLE

The fuel cell electrode units and CO filter layers discussed in FIGS. 5, 9 and 10 were prepared as follows:

MEA Preparation

Catalyst and filter layers were prepared as inks and applied to NAFION™ membranes in accordance with the methods taught in U.S. Pat. Nos. 5,211,984 and 5,234,777, herein incorporated by reference in their entirety.

As previously discussed, two types of fuel cell catalysts were compared in FIGS. 9 and 10: pure platinum, and a platinum/ruthenium alloy. For the pure platinum catalyst layers used (all curves in FIG. 5 and curves 1,3 and 4 in FIGS. 9 and 10), a Pt/C ink having 60% Pt/C (Etek, Natick, Mass.) and 5% NAFION™ solution (DuPont, Wilmington, Del.) was prepared in isopropanol. For the platinum/ruthenium alloy used (curve 2 of FIGS. 9 and 10), a Pt:Ru/C ink having 40% Pt:Ru/C (Pt:Ru weight ratio of about 2:1) and 5% NAFION™ solution was prepared in isopropanol. The inks were stirred for a minimum of eight hours at room temperature to uniformly disperse the catalysts in the inks.

To bond the fuel cell catalysts to the membranes, the inks were applied to pre-weighed, 3-ply polytetrafluoroethylene (PTFE) decals using Meyer rods. A #50 or #52 Meyer rod was used for the Pt/C ink, and a #60 or #70 rod was used for the Pt:Ru/C ink. The target anode loadings were 0.4–0.45 mg $Pt/cm^2$ and 0.6 mg $Pt:Ru/cm^2$. The pure platinum ink was used for the cathode catalyst in each case, and the target cathode loading was 0.5 mg $Pt/cm^2$. The ink-coated decals were dried in an oven at 105° C. at ambient pressure for 10 minutes to dry the inks.

An assembly was formed by placing a dried ink-coated decal (Pt/C/NAFION™ or Pt:Ru/C/NAFION™) on each side of a NAFION™ 112 (proton form) membrane (available from DuPont, Wilmington, Del.). The assembly was placed in a conventional hot press, which was then lightly loaded until the press heated to 205° C. The assembly was hot pressed at 580 psi for 2 minutes. The assembly was removed from the press and allowed to cool.

The decals were then peeled from the membrane, leaving the Pt/C/NAFION™ or Pt:Ru/C/NAFION™ adhered to the membrane to form an MEA. In this example, the area of the MEA was 50 cm². The NAFION™ content in the catalyst layers was about 25%.

CO Filter Preparation

In this Example, ruthenium is utilized for the CO filter layer. The ruthenium filter layer was prepared by forming an ink having 20% Ru/C and 5% NAFION™ solution was prepared in isopropanol. The ink was applied to the membrane side of an uncatalyzed carbon cloth GDL with 2% PTFE. The GDL was 7.5 mils thick and had an area of 50 cm². The ink was applied to the non-catalyst side of the GDL using a #28 Meyer rod to achieve a target loading of 0.21–0.25 mg Ru/cm², and dried at 105° C. for 10 minutes.

Test Conditions

Each cell assembly was pre-conditioned for a minimum of 8 hours under the following conditions: ambient pressure; $T_{cell}=70°$ C.; $T_{anode}=85°$ C.; $T_{cathode}=65°$ C.; anode flow= 0.60 SLM $H_2$; and cathode flow=1.8 SLM air. The reactants were water-saturated.

Each cell assembly was then tested under the following conditions: ambient pressure; $T_{cell}=70°$ C.; $T_{anode}=85°$ C.; $T_{cathode}=65°$ C.; anode flow=1.5 SLM reformate (on a dry basis: 40% $H_2$, 25% $CO_2$, 50 ppm CO, balance $N_2$); and cathode flow=1.8 SLM air. Air was fed into the anode gas stream at rates equal to 2% oxygen (1% in FIG. 9) of the air bleed relative to the amount of hydrogen in the reformate. For example, if 1.5 SLM of reformate is fed into the anode, then there is 0.6 SLM of hydrogen. For a 2% oxygen addition, this requires an oxygen flow rate of 0.012 SLM, which is equal to an air flow rate of 0.057 SLM with the anode stream. Therefore, the total flow of gas in the anode stream is 1.557 SLM. In separate tests, 1% and 0.5% oxygen delivered as air bleeds were also added to the anode gas stream.

The foregoing example is for illustrative purposes only and is not intended as limiting.

Other embodiments are within the claims.

What is claimed is:

1. An electrode unit comprising:
   a first gas diffusion layer;
   a second gas diffusion layer;
   a solid electrolyte between the first and the second gas diffusion layers;
   a first catalyst layer between the solid electrolyte and the first gas diffusion layer;
   a first carbon monoxide filter layer between the first catalyst layer and the first gas diffusion layer; and
   a second catalyst layer between the solid electrolyte and the second gas diffusion layer.

2. The electrode unit of claim 1, wherein the first carbon monoxide filter layer comprises a material selected from a group consisting of molybdenum, nickel, rhodium, ruthenium, tin, tungsten, and alloys thereof.

3. The electrode unit of claim 1, wherein the first carbon monoxide filter layer comprises a material selected from the group consisting of ruthenium and an alloy thereof.

4. The electrode unit of claim 1, wherein the solid electrolyte comprises a sulphonated fluorocarbon polymer.

5. The electrode unit of claim 1, the first and second catalyst layers comprise a material selected from the group consisting of platinum and an alloy thereof.

6. The electrode unit of claim 1, further comprising a second carbon monoxide filter layer between the second catalyst layer and the second gas diffusion layer.

7. The electrode unit of claim 6, wherein the second carbon monoxide filter layer comprises a material selected from a group consisting of molybdenum, nickel, rhodium, ruthenium, tin, tungsten, and alloys thereof.

8. The electrode unit of claim 7, wherein the second carbon monoxide filter layer comprises a material selected from the group consisting of ruthenium and an alloy thereof.

9. The electrode unit of claim 6, wherein the first carbon monoxide filter layer comprises a material selected from a group consisting of ruthenium, rhodium, tungsten, nickel and alloys thereof.

10. The electrode unit of claim 6, wherein the first carbon monoxide filter layer comprises a material selected from the group consisting of ruthenium and an alloy thereof.

11. The electrode unit of claim 6, wherein the solid electrolyte comprises a sulphonated fluorocarbon polymer.

12. The electrode unit of claim 6, the first and second catalyst layers comprise a material selected from the group consisting of platinum and an alloy thereof.

13. The electrode unit of claim 1, wherein the first carbon monoxide filter layer is capable of preventing at least about 50% of the carbon monoxide contacting the first carbon monoxide filter layer from contacting the first catalyst layer.

14. The electrode unit of claim 1, wherein the first carbon monoxide filter layer is capable of preventing at least about 75% of the carbon monoxide contacting the first carbon monoxide filter layer from contacting the first catalyst layer.

15. The electrode unit of claim 1, wherein the first carbon monoxide filter layer is capable of preventing at least about 90% of the carbon monoxide contacting the first carbon monoxide filter layer from contacting the first catalyst layer.

16. The electrode unit of claim 1, wherein, under other identical reaction conditions, hydrogen reacts at least about 10 times more quickly with the first catalyst layer than with the first carbon monoxide filter layer.

17. The electrode unit of claim 1, wherein, under other identical reaction conditions, hydrogen reacts at least about 50 times more quickly with the first catalyst layer than with the first carbon monoxide filter layer.

18. The electrode unit of claim 1, wherein, under other identical reaction conditions, hydrogen reacts at least about 100 times more quickly with the first catalyst layer than with the first carbon monoxide filter layer.

19. An electrode unit comprising:
    a first gas diffusion layer;
    a first carbon monoxide filter layer;
    a solid electrolyte between the first gas diffusion layer and the first carbon monoxide filter layer;
    a first catalyst layer between the solid electrolyte and the first gas diffusion layer; and
    a second gas diffusion layer between the solid electrolyte and the first carbon monoxide filter layer; and
    a second catalyst layer between the solid electrolyte and the second gas diffusion layer.

20. The electrode unit of claim 19, wherein the first carbon monoxide filter layer comprises a material selected from a group consisting of molybdenum, nickel, rhodium, ruthenium, tin, tungsten, and alloys thereof.

21. The electrode unit of claim 19, wherein the first carbon monoxide filter layer comprises a material selected from the group consisting of ruthenium and an alloy thereof.

22. The electrode unit of claim 19, wherein the solid electrolyte comprises a sulphonated fluorocarbon polymer.

23. The electrode unit of claim 19, the first and second catalyst layers comprise a material selected from the group consisting of platinum and an alloy thereof.

24. The electrode unit of claim 19, further comprising a second carbon monoxide filter layer between the second catalyst layer and the second gas diffusion layer.

25. The electrode unit of claim 24, wherein the second carbon monoxide filter layer comprises a material selected from a group consisting of molybdenum, nickel, rhodium, ruthenium, tin, tungsten, and alloys thereof.

26. The electrode unit of claim 25, wherein the second carbon monoxide filter layer comprises a material selected from the group consisting of ruthenium and an alloy thereof.

27. The electrode unit of claim 24, wherein the first carbon monoxide filter layer comprises a material selected from a group consisting of ruthenium, rhodium, tungsten, nickel and alloys thereof.

28. The electrode unit of claim 24, wherein the first carbon monoxide filter layer comprises a material selected from the group consisting of ruthenium and an alloy thereof.

29. The electrode unit of claim 24, wherein the solid electrolyte comprises a sulphonated fluorocarbon polymer.

30. The electrode unit of claim 24, the first and second catalyst layers comprise a material selected from the group consisting of platinum and an alloy thereof.

31. The electrode unit of claim 19, wherein the first carbon monoxide filter layer is capable of preventing at least about 50% of the carbon monoxide contacting the first carbon monoxide filter layer from contacting the first catalyst layer.

32. The electrode unit of claim 19, wherein the first carbon monoxide filter layer is capable of preventing at least about 75% of the carbon monoxide contacting the first carbon monoxide filter layer from contacting the first catalyst layer.

33. The electrode unit of claim 19, wherein the first carbon monoxide filter layer is capable of preventing at least about 90% of the carbon monoxide contacting the first carbon monoxide filter layer from contacting the first catalyst layer.

34. The electrode unit of claim 19, wherein, under other identical reaction conditions, hydrogen reacts at least about 10 times more quickly with the first catalyst layer than with the first carbon monoxide filter layer.

35. The electrode unit of claim 19, wherein, under other identical reaction conditions, hydrogen reacts at least about 50 times more quickly with the first catalyst layer than with the first carbon monoxide filter layer.

36. The electrode unit of claim 19, wherein, under other identical reaction conditions, hydrogen reacts at least about 100 times more quickly with the first catalyst layer than with the first carbon monoxide filter layer.

37. A fuel cell comprising:
a first flow field plate;
a second flow field plate;
a solid electrolyte between the first and second flow field plates;
a first catalyst layer between the solid electrolyte and the first flow field plate;
a first carbon monoxide filter layer between the first catalyst layer and the first flow field plate;
a first gas diffusion layer between the first carbon monoxide filter layer and the first flow field plate;
a second catalyst layer between the solid electrolyte and the second flow field plate; and
a second gas diffusion layer between the second catalyst and the second flow field plate.

38. The fuel cell of claim 37, wherein the first carbon monoxide filter layer comprises a material selected from a group consisting of ruthenium, rhodium, tungsten, nickel and alloys thereof.

39. The fuel cell of claim 37, wherein the first carbon monoxide filter layer comprises a material selected from the group consisting of ruthenium and an alloy thereof.

40. The fuel cell of claim 37, wherein the solid electrolyte comprises a sulphonated fluorocarbon polymer.

41. The fuel cell of claim 37, wherein the first and second catalyst layers comprise a material selected from the group consisting of platinum and an alloy thereof.

42. The fuel cell of claim 37, further comprising a second carbon monoxide filter layer between the second catalyst layer and the second gas diffusion layer.

43. The fuel cell of claim 42, further comprising a second carbon monoxide filter layer between the second catalyst layer and the second gas diffusion layer.

44. The fuel cell of claim 42, wherein the second carbon monoxide filter layer comprises a material selected from a group consisting of ruthenium, rhodium, tungsten, nickel and alloys thereof.

45. The fuel cell of claim 42, wherein the solid electrolyte comprises a sulphonated fluorocarbon polymer.

46. The fuel cell of claim 37, wherein the first carbon monoxide filter layer is capable of preventing at least about 50% of the carbon monoxide contacting the first carbon monoxide filter layer from contacting the first catalyst layer.

47. The fuel cell of claim 37, wherein the first carbon monoxide filter layer is capable of preventing at least about 75% of the carbon monoxide contacting the first carbon monoxide filter layer from contacting the first catalyst layer.

48. The fuel cell of claim 37, wherein the first carbon monoxide filter layer is capable of preventing at least about 90% of the carbon monoxide contacting the first carbon monoxide filter layer from contacting the first catalyst layer.

49. The fuel cell of claim 37, wherein, under other identical reaction conditions, hydrogen reacts at least about 10 times more quickly with the first catalyst layer than with the first carbon monoxide filter layer.

50. The fuel cell of claim 37, wherein, under other identical reaction conditions, hydrogen reacts at least about 50 times more quickly with the first catalyst layer than with the first carbon monoxide filter layer.

51. The fuel cell of claim 37, wherein, under other identical reaction conditions, hydrogen reacts at least about 100 times more quickly with the first catalyst layer than with the first carbon monoxide filter layer.

52. A fuel cell stack comprising:
a first fuel cell comprising:
a first flow field plate having an inlet;
a second flow field plate having an inlet;
a first solid electrolyte between the first and second flow field plates;
a first catalyst layer between the solid electrolyte and the first flow field plate;
a first carbon monoxide filter layer between the first catalyst layer and the first flow field plate;
a first gas diffusion layer between the first carbon monoxide filter layer and the first flow field plate;
a second catalyst layer between the solid electrolyte and the second flow field plate; and a second gas diffusion layer between the second catalyst and the second flow field plate; and a second fuel cell comprising:
a third flow field plate having an inlet in fluid communication with the first flow field plate inlet;
a fourth flow field plate having an inlet in fluid communication with the second flow field plate inlet;
a second solid electrolyte between the third and fourth flow field plates;
a third catalyst layer between the second solid electrolyte and the third flow field plate;
a third gas diffusion layer between the third catalyst layer and the third flow field plate;
a fourth catalyst layer between the second solid electrolyte and the fourth flow field plate; and
a fourth gas diffusion layer between the fourth catalyst and the fourth flow field plate.

53. The fuel cell stack of claim 52, wherein the second fuel cell further comprises a second carbon monoxide filter layer between the second catalyst layer and the second gas diffusion layer of the second fuel cell.

54. The fuel cell stack of claim 52, wherein the second carbon monoxide filter layer comprises a material selected from a group consisting of ruthenium, rhodium, tungsten, nickel and alloys thereof.

55. The fuel cell stack of claim 52, wherein the first carbon monoxide filter layer comprises a material selected from a group consisting of ruthenium, rhodium, tungsten, nickel and alloys thereof.

56. The fuel cell stack of claim 52, wherein the first carbon monoxide filter layer is capable of preventing at least about 50% of the carbon monoxide contacting the first carbon monoxide filter layer from contacting the first catalyst layer.

57. The fuel cell stack of claim 52, wherein the first carbon monoxide filter layer is capable of preventing at least about 75% of the carbon monoxide contacting the first carbon monoxide filter layer from contacting the first catalyst layer.

58. The fuel cell stack of claim 52, wherein the first carbon monoxide filter layer is capable of preventing at least about 90% of the carbon monoxide contacting the first carbon monoxide filter layer from contacting the first catalyst layer.

59. The fuel cell stack of claim 52, wherein, under other identical reaction conditions, hydrogen reacts at least about 10 times more quickly with the first catalyst layer than with the first carbon monoxide filter layer.

60. The fuel cell stack of claim 52, wherein, under other identical reaction conditions, hydrogen reacts at least about 50 times more quickly with the first catalyst layer than with the first carbon monoxide filter layer.

61. The fuel cell stack of claim 52, wherein, under other identical reaction conditions, hydrogen reacts at least about 100 times more quickly with the first catalyst layer than with the first carbon monoxide filter layer.

62. A method of operating a fuel cell system, the method comprising:
introducing a first gas to a first fuel cell;
contacting the first gas with a first carbon monoxide filter layer contained in the first fuel cell; and
contacting the first gas with a first catalyst layer contained in the first fuel cell and different than the first carbon monoxide filter layer.

63. The method of claim 62, wherein the first gas comprises hydrogen and carbon monoxide.

64. The method of claim 63, wherein the first gas further comprises oxygen.

65. The method of claim 62, wherein the first gas contacts the first carbon monoxide filter layer before contacting the first catalyst layer.

66. The method of claim 62, wherein contacting the first gas with the first carbon monoxide filter layer causes carbon monoxide to adsorb to the first carbon monoxide layer.

67. The method of claim 66, further comprising oxidizing the adsorbed carbon monoxide to form gaseous carbon dioxide.

68. The method of claim 62, further comprising:
introducing a second gas to the first fuel cell; and
contacting the second gas with a carbon second catalyst layer contained in the first fuel cell and different than the first catalyst layer.

69. The method of claim 68, wherein the second gas comprises a cathode gas.

70. The method of claim 68, further comprising contacting the second gas with a second carbon monoxide filter layer before contacting the second gas with the second catalyst layer, the second carbon monoxide filter layer being contained in the first fuel cell and being different than the second catalyst and first carbon monoxide filter layers.

71. The method of claim 68, wherein the first gas comprises hydrogen and contacting the first gas with the first catalyst layer forms protons and electrons.

72. The method of claim 71, wherein the second gas comprises oxygen.

73. The method of claim 71, further comprising reacting the protons and electrons with the oxygen to produce water and an electrical power output.

74. The method of claim 62, further comprising:
introducing the first gas to a second fuel cell;
contacting the first gas with a second catalyst layer contained in the second fuel cell.

75. The method of claim 74, further comprising:
contacting the first gas with a second carbon monoxide filter layer contained in the second fuel cell.

76. The method of claim 74, wherein the first and second gases are introduced to the first and second fuel cells, respectively, in parallel.

77. The method of claim 62, wherein the first carbon monoxide filter layer is capable of preventing at least about 50% of the carbon monoxide contacting the first carbon monoxide filter layer from contacting the first catalyst layer.

78. The method of claim 62, wherein the first carbon monoxide filter layer is capable of preventing at least about 75% of the carbon monoxide contacting the first carbon monoxide filter layer from contacting the first catalyst layer.

79. The method of claim 62, wherein the first carbon monoxide filter layer is capable of preventing at least about 90% of the carbon monoxide contacting the first carbon monoxide filter layer from contacting the first catalyst layer.

* * * * *